United States Patent
Cooper et al.

(10) Patent No.: US 11,183,104 B2
(45) Date of Patent: Nov. 23, 2021

(54) METHOD AND APPARATUS FOR COLOUR IMAGING

(71) Applicant: DisplayLink (UK) Limited, Cambridge (GB)

(72) Inventors: Patrick Cooper, Cambridge (GB); Matthew Parks, Cambridge (GB); Colin Skinner, Cambridge (GB)

(73) Assignee: DISPLAYLINK (UK) LIMITED, Cambridge-Cambridgeshire (GB)

( * ) Notice: Subject to any disclaimer, the term of this patent is extended or adjusted under 35 U.S.C. 154(b) by 0 days.

(21) Appl. No.: 16/869,842

(22) PCT Filed: Jan. 8, 2019

(86) PCT No.: PCT/GB2019/050044
§ 371 (c)(1),
(2) Date: May 8, 2020

(87) PCT Pub. No.: WO2019/092462
PCT Pub. Date: May 16, 2019

(65) Prior Publication Data
US 2020/0327700 A1    Oct. 15, 2020

(30) Foreign Application Priority Data

Nov. 8, 2017 (GB) .................................. 1718488
Mar. 1, 2018 (GB) .................................. 1803339
Apr. 16, 2018 (GB) .................................. 1806208

(51) Int. Cl.
*G06T 9/00* (2006.01)
*G09G 3/20* (2006.01)
(Continued)

(52) U.S. Cl.
CPC ....... *G09G 3/2092* (2013.01); *G02B 27/0172* (2013.01); *G06F 3/147* (2013.01);
(Continued)

(58) Field of Classification Search
CPC .......... G09G 3/2092; G09G 2300/026; G09G 2320/04; G09G 2360/04; H04N 13/344;
(Continued)

(56) References Cited

U.S. PATENT DOCUMENTS 9,779,478 B1    10/2017  Wilson et al.
2005/0013500 A1   1/2005  Lee et al.
(Continued)

FOREIGN PATENT DOCUMENTS

JP    2004112566    4/2004
WO   2007079781    7/2007
(Continued)

OTHER PUBLICATIONS

International Search Report for International Application No. PCT/GB2019/050044, dated May 6, 2019, (6 pages).
(Continued)

*Primary Examiner* — Chong Wu
(74) *Attorney, Agent, or Firm* — Paradice & Li LLP

(57) ABSTRACT

A method for processing data for display on a screen involves encoding, using a first colour space, a first portion of image data intended to be displayed on a first area of the screen and encoding, using a second colour space, a second portion of image data intended to be displayed on a second area of the screen. The encoded first and second portions of the image data are compressed, and transmitted over a link for display on the screen. By using different colour spaces to encode image data that is displayed in different parts of a screen, differences in a user's vision and/or aberrations caused by display equipment may be accounted for and so provide an improved user experience. Using different colour spaces for different screen areas may also reduce the amount
(Continued)

of data that needs to be transmitted, for example by encoding image data more effectively and/or allowing more efficient compression of data.

20 Claims, 6 Drawing Sheets

(51) Int. Cl.
| | |
|---|---|
| *H04N 13/344* | (2018.01) |
| *G02B 27/01* | (2006.01) |
| *G06F 3/14* | (2006.01) |
| *G06F 3/147* | (2006.01) |
| *G06T 19/00* | (2011.01) |

(52) U.S. Cl.
CPC .......... *G06F 3/1407* (2013.01); *G06F 3/1423* (2013.01); *G06T 9/00* (2013.01); *G06T 19/006* (2013.01); *H04N 13/344* (2018.05); *G09G 2300/026* (2013.01); *G09G 2320/04* (2013.01); *G09G 2360/04* (2013.01)

(58) Field of Classification Search
CPC . G02B 27/0172; G06F 3/1407; G06F 3/1423; G06F 3/147; G06T 9/00; G06T 19/006
See application file for complete search history.

(56) References Cited

U.S. PATENT DOCUMENTS

| | | | |
|---|---|---|---|
| 2017/0094289 A1 | 3/2017 | Altmann | |
| 2018/0096461 A1* | 4/2018 | Okayama | ................. G06T 7/10 |
| 2018/0308266 A1* | 10/2018 | Surti | ..................... G06T 3/0012 |

FOREIGN PATENT DOCUMENTS

| | | |
|---|---|---|
| WO | 2016054765 | 4/2016 |
| WO | 2016157677 | 10/2016 |

OTHER PUBLICATIONS

XP002788904, dated Apr. 12, 2016, retrieved from internet: URL:https://web.archive.org/web/2016041219 2639/https://en.wikipedia.org/wiki/Image_compression [retrieved on Feb. 14, 2019] the whole document.
Combined Search and Examination Report for International Application No. GB1806208.3, dated Oct. 17, 2018 (6 pages).
Combined Search and Examination Report for International Application No. GB1914690.1, dated Mar. 26, 2020 (3 pages).
Combined Search and Examination Report for International Application No. GB1914693.5, dated Mar. 26, 2020 (3 pages).

* cited by examiner

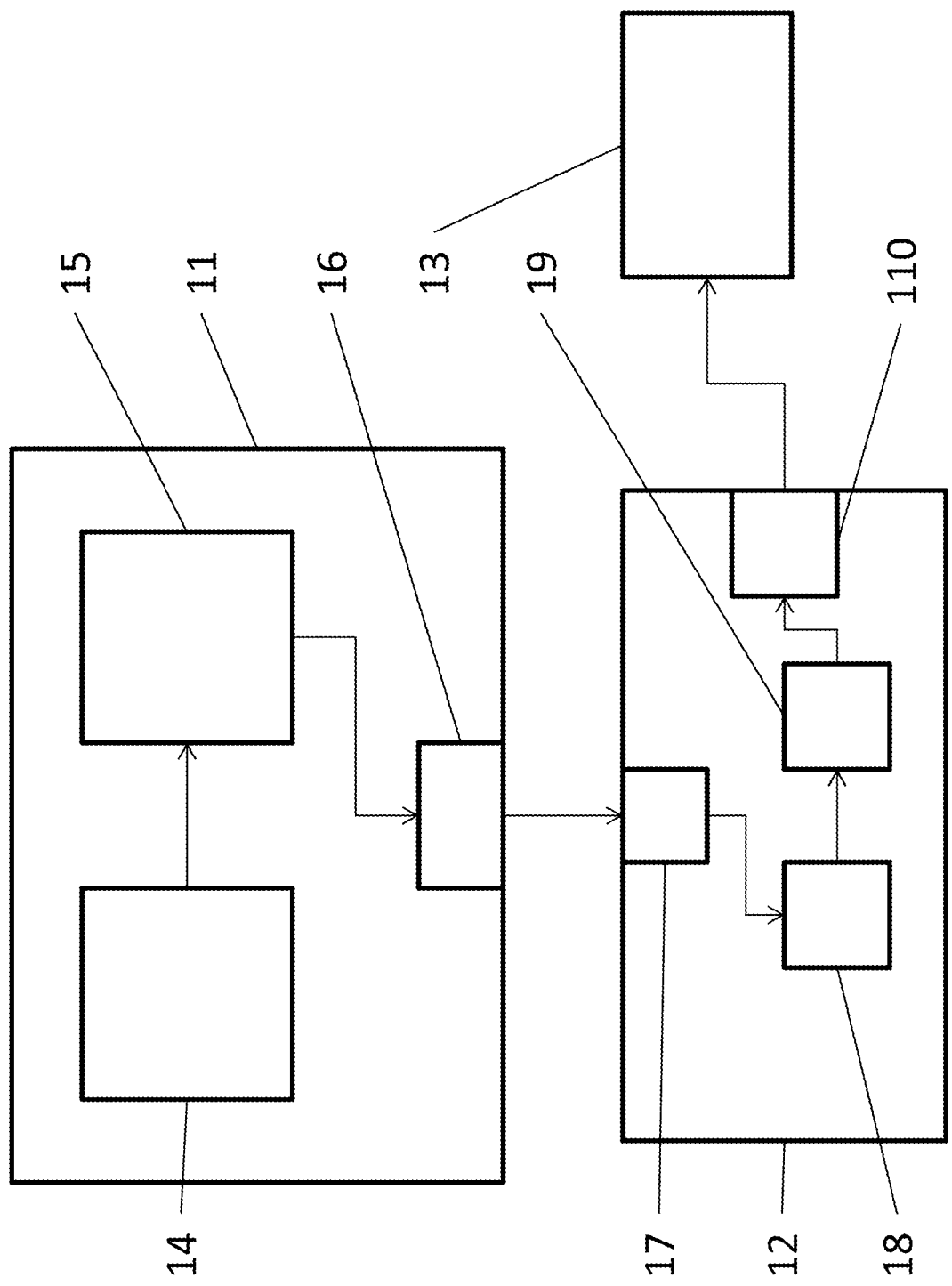

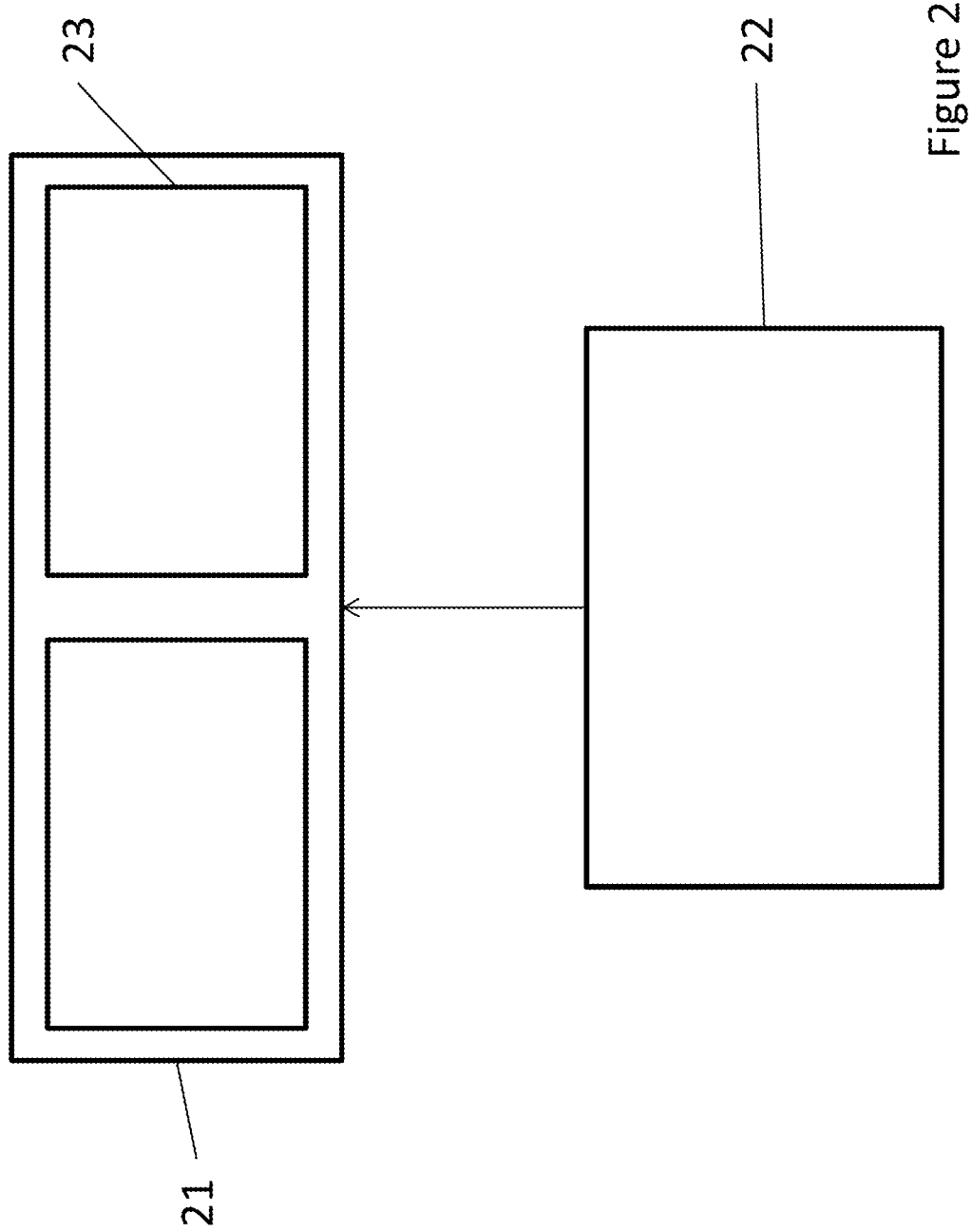

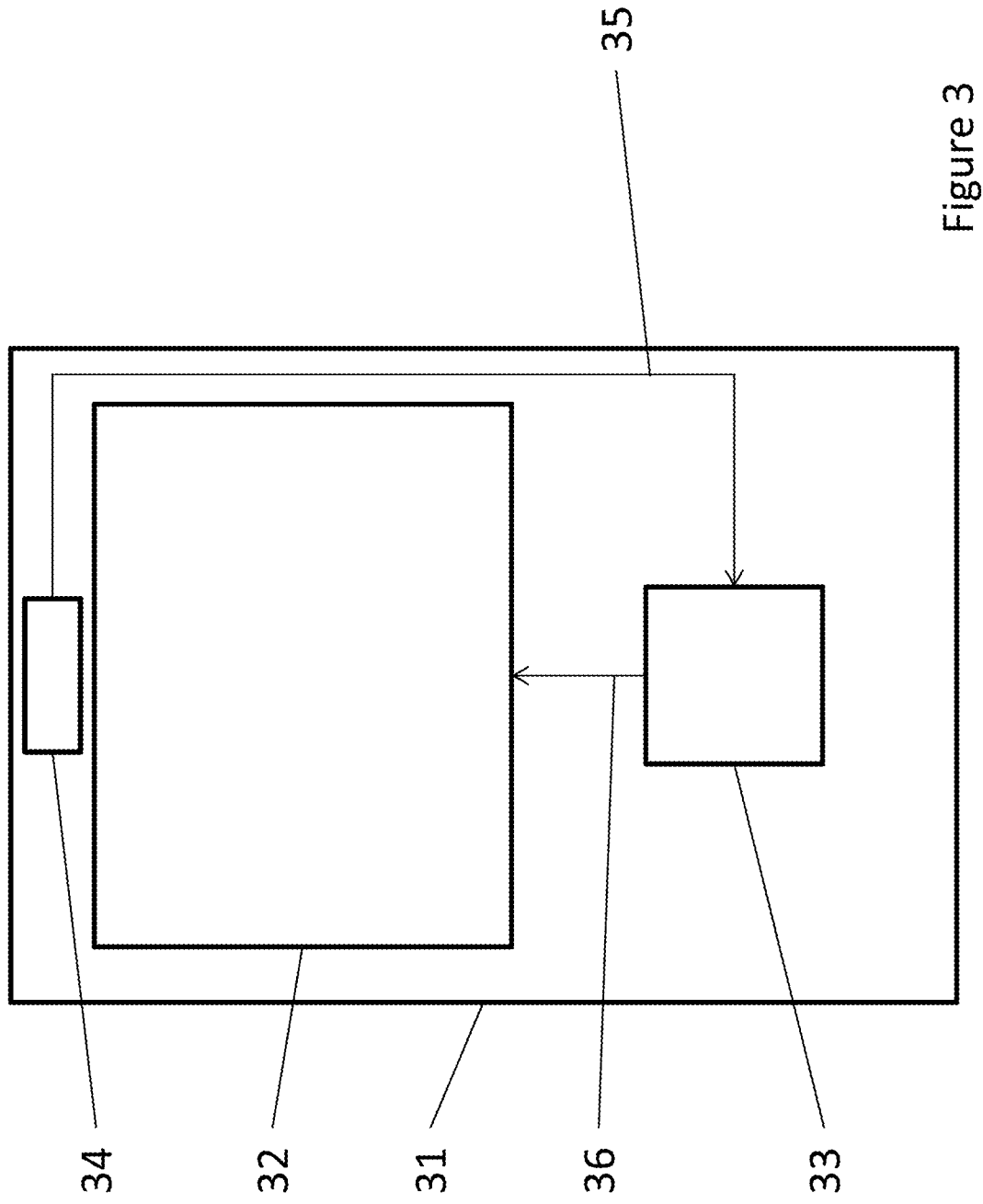

METHOD AND APPARATUS FOR COLOUR IMAGING

CROSS REFERENCE TO RELATED APPLICATIONS

This application claims priority to International Patent Application No. PCT/GB2019/050044, filed Jan. 8, 2019, which claims the benefits of GB1718488.8 filed Nov. 8, 2017, GB 1803339.9 filed Mar. 1, 2018, and GB 1806208.3 filed Apr. 16, 2018. The contents of these prior patent documents are incorporated herein by reference.

FIELD OF THE INVENTION

The present invention relates to image processing. More particularly, the present invention relates to altering colour space in image data, which may allow more effective transmission and provide an improved user experience.

BACKGROUND OF THE INVENTION

Current development of display technology, especially in virtual reality, aims to match the performance of computer displays to the performance of the human eye. However, as more and more display data is required in more complicated scenarios, and it is desirable to use wireless technology, rather than wires, the amount of data to be sent becomes very large. Although, in some cases, the display data is compressed, before being transmitted, wirelessly or through wires, it would still be desirable to try to minimise the amount of data that actually needs to be sent.

Accordingly, the present invention tries to reduce the amount of display data that needs to be sent for display to try to mitigate the above problems.

SUMMARY OF THE INVENTION

Aspects of the invention are set out in the independent claims and preferred features are set out in the dependent claims.

There is described herein a method for processing data for display on a screen, the method comprising the steps of: encoding, using a first colour space, a first portion of image data intended to be displayed on a first area of the screen; encoding, using a second colour space, a second portion of image data intended to be displayed on a second area of the screen; compressing the encoded first and second portions of the image data for transmission; and transmitting the compressed image data over a link for display on the screen.

By using different colour spaces to encode image data that is displayed in different parts of a screen it may be possible to account for differences in a user's vision and/or aberrations caused by display equipment and so provide an improved user experience. Using different colour spaces for different screen areas may also reduce the amount of data that needs to be transmitted, for example by encoding image data more effectively and/or allowing more efficient compression of data.

The first and second areas of the screen may not be continuous, for example for a square or rectangular screen the first area may be a central part of the screen, such as a circle in the centre of a screen that touches one or more of the peripheral edges of the screen, while the second area may be the corner sections of the screen. In some examples one or more of the first and second areas may be circular or may be annular. For example the first area may be circular and the second area may be an annular area surrounding the first area. The areas of the screen will generally be symmetrical, but could in some embodiments be asymmetric.

The encoding of the different portions of image data may be performed by using different mapping functions, e.g. a first mapping function and a second mapping function for the first and second portions of image data respectively, to transform the data between colour spaces. For example, all image data for display on the screen (including at least the first and second portions of image data) may be received (e.g. from a video or image recording device) already described in an initial colour space and encoding the first and second portions using first and second colour spaces may involve transforming the image data from the initial colour space to the first/second colour space. In some examples, the initial colour space may be the same as either the first or the second colour space. In such a situation, encoding the image data may comprise utilising a null mapping function.

The method may further comprise: defining a first area and a second area of the screen; and selecting, from a plurality of colour spaces, a first colour space for encoding data for display on the first area and a second colour space for encoding data for display on the second area.

The screen may, for example, be a display panel, such as a display panel of a headset display.

Preferably, the first area is a central zone of the screen and/or an area expected or intended to be viewed in a central portion of a viewer's vision. Preferably the second area is a peripheral zone of the screen and/or an area expected or intended to be viewed in a peripheral portion of the viewer's vision.

In some examples, image data to be displayed at the periphery of the screen (or display panel) may in fact be in centre of a user's vision and thus should be treated as central data, for example where the image data is intended to be displayed on multiple displays (e.g. in the case of goggles having two displays, one for each eye).

In some embodiments the method further comprises: providing a model of the sensitivity of a viewer to light displayed at different locations on the screen; and selecting the first and second colour spaces and/or defining the first and second areas of the screen based on the model of the sensitivity of the viewer. This model may, for example, take into account the intended position of the screen in relation to a viewer in use.

The model of the sensitivity of the viewer may be a model of a typical, average viewer, for example obtained from taking measurements of a group of people. The model may be based on particular characteristics of a user's eye, or group of users, e.g. for users with an astigmatism. In some embodiments the model may be an individual model, tailored to the viewer.

The model of the sensitivity of a viewer to light comprises a measure of the sensitivity of the viewer to at least one of: chrominance, luminance, and light of different wavelengths. This may, for example, be based on a measure of the density of photoreceptors at different positions in the human eye (or retina), e.g. based on an average measure of the density. For example it may be based on a measure of the density of rods and cones at different positions on the retina of a specific viewer, or an average across a group of viewers. The portions of the screen may be selected based on what part of the eye (or retina) the light from that part of the screen is likely to be focussed on, during normal use of the screen. For example, the screen may be configured such that, in normal use, the first portion of data is viewed in the user's foveal vision and the second portion viewed in the user's peripheral vision.

The method may further comprise defining the first and second areas of the screen by: comparing the modelled sensitivity of the viewer across the screen to a threshold sensitivity; defining an area of the screen for which the modelled sensitivity is above the threshold sensitivity as the first area of the screen; and defining an area of the screen for which the user sensitivity is below the threshold sensitivity as the second area of the screen.

Definition of the first and second areas of the screen may be performed on a tile-by-tile basis. Thus each tile may be entirely within either the first or second area, rather than some of the tiles being split between the first and second areas.

Preferably the model of the sensitivity of the viewer to light is based on an expected sensitivity of the viewer to light across the viewer's visual field and which locations of the screen are expected to be in the viewer's visual field in use. This may be done by looking at the likely or intended position of a viewer's eye, and particularly the retina, in relation to the screen.

The model of the sensitivity of a viewer to light displayed at different locations on the screen may be based on the configuration of the screen equipment and the expected position of the viewer in relation to the screen equipment in use.

The method may further comprise: determining a model of chromatic aberration of image data displayed on the screen; selecting the first and second colour spaces and/or defining the first and second areas of the screen based on the determined model of chromatic aberration across the screen. The model of chromatic aberration may be the expected amount of chromatic aberration viewed by a user based on the screen configuration and a lens through which the user is to view the image data on the screen.

The model of chromatic aberration is based on the arrangement or configuration of the display equipment and/or the expected position of the viewer's eye in use, specifically, in some cases, the position of the retina.

Preferably, determining a model of chromatic aberration across the frame comprises: obtaining information regarding at least one characteristic of a lens located between the screen and the expected position of a viewer's eye in use.

The at least one characteristic of the lens may comprise one or more of: the curvature of the lens; the thickness of the lens; and the size or shape of lens (for example the radial extent of the lens). Thus it may be possible to calculate the chromatic aberration introduced by the lens.

Preferably, determining a model of chromatic aberration across the frame comprises obtaining information regarding one or more of: the intended distance from the user's eye of the screen and/or lens in use; and the intended distance of the screen from the lens in use.

In some embodiments the method further comprises: receiving image data intended to be displayed on the screen, prior to the steps of encoding the first and second portions of image data.

In some embodiments, the method further comprises: analysing the image data across the screen to identify a measure of the likely perceptual significance of the image data; selecting the first and second colour spaces and/or defining the first and second areas of the screen based on the measure of the likely perceptual significance. The perceptual significance may relate to the expected relevance of the image data to a user's perception. For example, different contrast, brightness, colours, edges and/or movement in the image data may be more perceptually significant. E.g. If a lot of movement is happening on one area of the screen, the user's attention may be drawn to that area, so more detail or higher resolution or a different colour space should be used for data to be displayed in that area.

In preferred embodiments, the first portion of image data has a higher likely perceptual significance than the second portion of image data.

Preferably, analysing the image data to identify the expected relevance of the image data to a user's perception comprises analysing one or more of: the amount or rate of movement in the image data (when the image data relates to video); and the presence of lines or contours, edges, colour transitions, sharpness, or contrast in the image data. For example, areas with more movement may have more relevance to perception. Each tile may be allocated an expected relevance value. Generally areas in the central portion of a user's vision would have more perceptual significance.

Preferably, the first colour space is based on a first colour model and the second colour space is based on a second colour model that is different from the first colour model. Each colour space may have an associated colour model.

In alternative embodiments, the first colour space and the second colour space are based on the same colour model; and the first colour space is defined by a first colour mapping function and the second colour space is defined by a second colour mapping function that is different from the first colour mapping function.

Preferably, the first colour space is based on a colour model having at least a luminance component and a chrominance component, preferably two chrominance components; and/or the second colour space is based on a colour model having three colour components, or chrominance components.

Preferably, the colour model having three colour, or chrominance, components is based on RGB, or modified versions thereof; and/or the colour model having a luminance and two chrominance components is based on YUV, or modified versions thereof.

The colour spaces may be based on one or more of the following colour models: RGB, YUV, and HSL, or modified versions thereof.

In some embodiments, encoding the first portion of image data and/or encoding the second portion of image data comprises: altering, e.g. by transforming or converting, the colour space of previously encoded image data. For example, a mapping may be applied. In some embodiments a null mapping function may be used for the first or second portion of data, e.g. where received data is already encoded in the desired colour space.

Optionally, encoding the image data comprises performing a discrete cosine transform (DCT) to obtain a DC term and a plurality of AC terms for each frame block of the image data. A DCT generally produces, for each tile having a number of pixel values, a DC term, which corresponds to the average of the values of the pixels in a tile, such as the average colour or average brightness, and a number of AC terms, which represent difference values in the colour or brightness for the pixels in the tile. The AC values are generally stored in order of increasing value. Thus for a tile size of N pixels, performing a DCT transform results in generation of a single DC value and also in generation of N-1 AC values, one for each of the remaining pixels in the frame, these AC values representing the colour change between the pixels, across the frame.

Preferably, compressing the encoded first and second portions of the image data for transmission comprises: compressing the encoded first portion of image data using a compression method that is less lossy than the compression method used for compressing the second portion of the image data. For example, a first compression method may be used for the first portion of image data and a second compression method for the second portion of image data and the second compression method may reduce image data resolution more than the first compression method. In some examples the first compression method may be a lossless compression method.

In some embodiments, compressing the encoded first and/or second portions of the image data for transmission is dependent on the colour encoded for in the image data, for example wherein the information retained relating to one colour is greater than the information retained relating to another colour. Preferably, compressing the encoded second portion of the image data comprises retaining information relating to blue colours (e.g. wavelengths of around 450-490 nm) preferentially over data relating to other colours. Sensitivity to blue light is generally better than sensitivity to light of other wavelengths towards the peripheral area (non-foveal area) of the eye, e.g. due to the distribution of rods and cones on the retina. Therefore an improved user experience may be provided, whilst reducing the amount of data that needs to be transferred (and thus reducing bandwidth requirements and/or increasing speed), by maintaining image data relating to blue colours over data relating to other colours.

Preferably, the image data comprises a set of tiles, and a single colour space is used to encode data for each tile.

Preferably, the method further comprises: transmitting one or more flag bits per tile identifying the colour space used to encode the image data for that tile.

In some embodiments, the first and second colour spaces and/or first and second areas are predetermined.

In other embodiments, the first and second colour spaces and/or first and second areas are dynamically defined. For example, they may vary between images, or frames, or vary between different series of images.

Preferably, the first and second colour spaces and/or first and second areas are defined based on one or more of: a detection of the position or orientation of the eye of a viewer; a model of the vision of an individual user or general model; image content; image data; and a measured data speed or latency in the link (e.g. so amount of data or resolution is increased as speed/latency increases and vice versa). The position or orientation of the eye may be a general value, for example a measure of the positioning/direction of a user's eye as an average over a period of time, or it may relate to an instantaneous value, e.g. in the case that a user's eye is moving whilst viewing images, such as to focus on images displayed on a particular area of the screen. Thus it may be possible to adapt the display to the particular user and/or situation. A general model may be based on a typical, average viewer, for example obtained from taking measurements of a group of people.

In some examples, the method may further comprise one or more of: measuring the position or orientation of the eye of a viewer; measuring the vision of an individual user and/or group of users; measuring the data speed or latency in the link.

There is also described herein a method for processing data for display on a screen, the method comprising the steps of: receiving compressed image data over a link, wherein the compressed image data comprises: a first portion of image data, encoded using a first colour space; and a second portion of image data, encoded using a second colour space; decompressing the compressed image data; identifying the first image data and the corresponding first colour space and the second image data and the corresponding second colour space; decoding the image data; providing the first portion of image data for display on a first area of the screen; and providing the second portion of image data for display on a second area of the screen.

Providing the data for display on a screen may comprise sending the decoded data to a display device or component, e.g. over a wireless or wired link. Identifying the first image data and corresponding first colour space and the second image data and the corresponding second colour space may be performed by recognising or identifying a flag indicative of the colour space used, e.g. each tile in the data may have one or more associated flag bits corresponding to the colour space used to encode the image data for that tile.

The method may further comprise: displaying the first portion of image data on a first area of the screen; and displaying the second portion of image data on a second area of the screen.

Preferably, decoding the image data comprises: transforming the colour space of at least one of the first and second portions of image data. Preferably the screen equipment is configured for display of image data in the colour space to which the data is transformed. In some embodiments the screen equipment may be capable of or arranged to display image data coded using the first and/or the second colour space and thus no transformation is required for one or both.

In some embodiments the screen (and lens, where present) are mounted in a remote device, such as a headset configured to be worn on a viewer's head, preferably a virtual reality headset or an augmented reality set of glasses. Where there are two screens (e.g. in glasses or goggles), the different areas may be the same (or symmetrical mirror images) or may be different for each (e.g. for viewers with different eyes, or to reflect different images being displayed on each one). In some embodiments the remote device may be configured for displaying a stereoscopic image and/or the image data may be arranged to support a stereoscopic display.

Preferably, the link is a wireless link.

In some embodiments, the display data comprises a set of frames for display on the screen at a frame rate of at least 50 frames per second, preferably at least 70 frames per second, more preferably about 90 frames per second. Normally the frame rate will be less than 200 frames per second.

Optionally, each of the first area of the screen and the second area of the screen make up at least 10% of the total screen, preferably at least 15%, more preferably at least 20% or at least 30%.

There is also described herein an encoder device for processing data for display on a screen, the encoder device comprising: a processor; a memory; and an interface for communicating with a decoder device over a link; wherein the encoder device is arranged to: encode, using a first colour space, a first portion of image data intended to be displayed on a first area of the screen; encode, using a second colour space, a second portion of image data intended to be displayed on a second area of the screen; compress the encoded first and second portions of the image data for transmission; and transmit the compressed image data over the link for display on the screen.

Preferably, the encoder device is further arranged to perform methods set out above.

There is also described herein a decoder device for processing data for display on a screen, the decoder device comprising: a processor; a memory; and an interface for communicating with an encoder device over a link; wherein the encoder device is arranged to: receive compressed image data over the link, wherein the compressed image data comprises: a first portion of image data, encoded using a first colour space; and a second portion of image data, encoded using a second colour space; decompress the compressed image data; decode the image data; provide the first portion of image data for display on a first area of the screen; and provide the second portion of image data for display on a second area of the screen.

The decoder device may be arranged to perform a method as set out above.

There is also described herein a system for displaying image data, the system comprising: an encoder device as set out above; a decoder device as set out above; and a screen for displaying the image data.

The system may further comprise a lens for positioning, in use, between the screen and the eye of a user.

The screen may be mounted in a remote device, such as a headset configured to be worn on a viewer's head, preferably a virtual reality headset or an augmented reality set of glasses.

In some embodiments, the decoder device is located in, or integral in, the remote device.

In some embodiments, the encoder device and the decoder device are arranged to communicate via a wireless link.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

Embodiments will now be described, by way of example only and with reference to the accompanying drawings, in which:

FIG. 1 illustrates an exemplary system for displaying images;

FIG. 2A illustrates an exemplary display device;

FIG. 3 illustrates another exemplary display device system; and

DETAILED DESCRIPTION OF THE INVENTION

Colour Vision

Figure 2B:
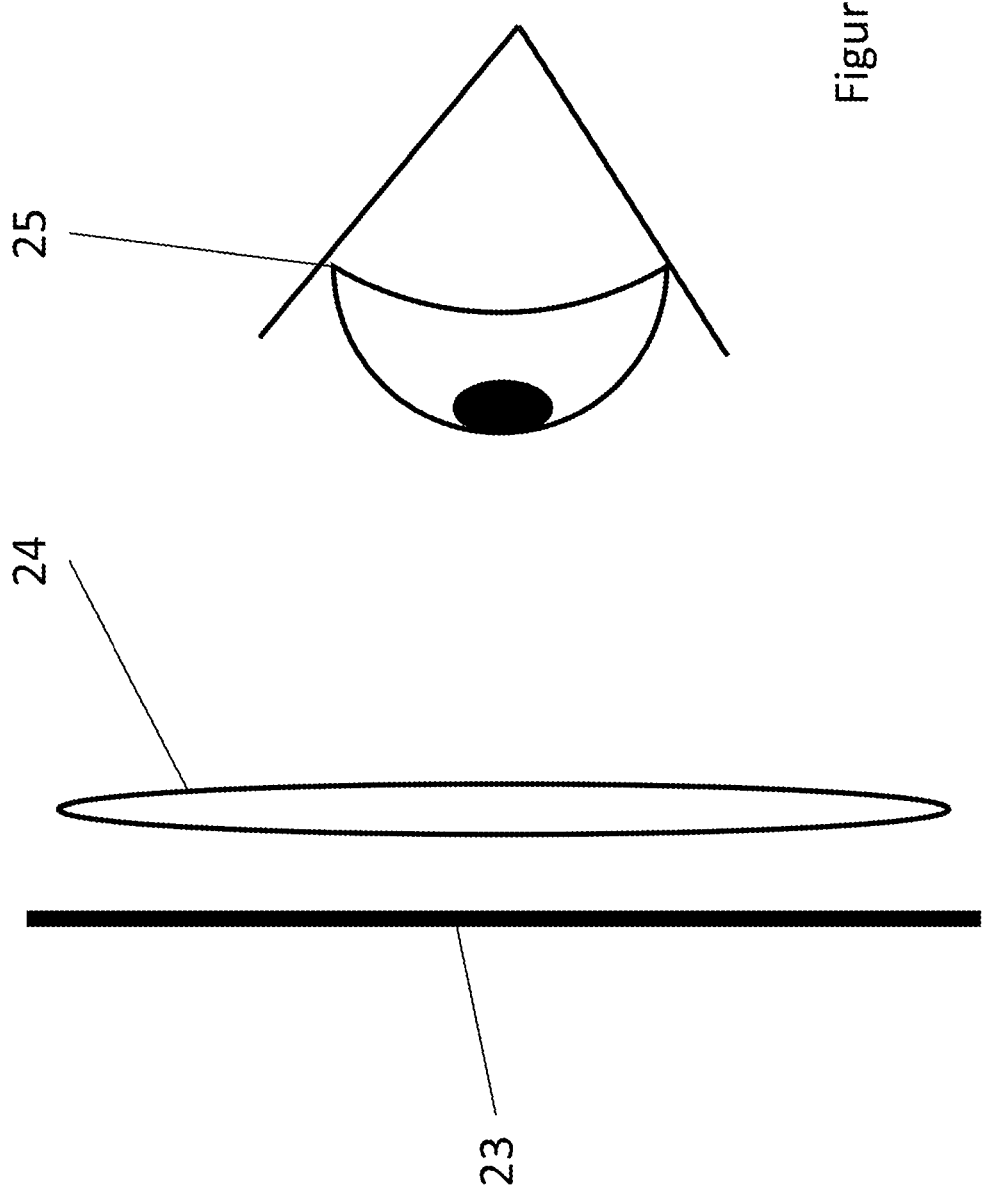
FIG. 2B illustrates an exemplary display device and user's eye.

There are two basic types of photoreceptors in the human eye: rods and cones. The cones are mostly active in normal lighting, such as daylight or ambient indoor lighting. This provides what is known as Photopic vision, which includes full colour range, responsiveness to small, fast movements, and greatest sensitivity in the foveal area of the eye (or fovea centralis) as this is where the cones are most concentrated; the density of cones quickly reduces towards the periphery of the retina.

Cones are one of three types of photoreceptor cells in the retina of mammalian eyes (e.g. the human eye): S-cones, M-cones and L-cones. Each type of cone is sensitive to different wavelengths of light that correspond to short-wavelength, medium-wavelength and long-wavelength light in the visible spectrum. The cones have different response curves to light radiation and thus respond to variation in colour in different ways, resulting in trichromatic vision. The three pigments responsible for detecting light may vary in their exact chemical composition in different individuals due to genetic mutation and thus different individuals will have cones with different colour sensitivity, however colour perception follows the same general trend across the human population (in the absence of abnormalities such as those which cause colour blindness).

S-cones have peak wavelengths around 564-580 nm, M-cones around 534-545 nm, and L-cones around 420-440 nm. The difference in the signals received from the three cone types allows the brain to perceive a continuous range of colours. As an example, yellow would be perceived when the L cones are stimulated slightly more than the M cones, and the colour red would be perceived when the L cones are stimulated significantly more than the M cones. When the S receptor is stimulated more, blue/violet colours would be perceived.

Colour perception varies across the visual field due to differences in the density of cones in the eye, being better in the fovea and less good in the periphery. Sensitivity to blue light is enhanced compared to sensitivity to other light of other wavelengths towards the peripheral.

Conventional virtual-reality headsets include goggles comprising two small displays, each with a lens between it and the user's eye. This allows the user to view the display from a very short distance away, as otherwise the user would be unable to focus. The lens may introduce distortions, such as chromatic aberration, e.g. a lens may introduce a colour shift to the image as observed by the viewer. For example, thick glass may introduce a slight blue or green tint, particularly in peripheral areas.

Encoding of Colour Images

There are several different types of colour space used in imaging. A colour space allows for a representation of colours to be encoded in digital data. Some colour spaces are based on the RGB colour model, which uses additive primary colours (red, blue, green).

The term "colour space" may be used to describe a particular combination of a colour model and mapping function. A mapping function for a colour space defines a link between the colour model and a reference colour space, thereby defining a colour space. In some cases the term "colour space" is also used (generally more informally) to identify a colour model. However, although identifying a colour space may also automatically identify the associated colour model, the converse is not necessarily true as each colour model may have several associated colour spaces. For example, several specific colour spaces are based on the RGB colour model.

CMYK is another colour model which uses subtractive colours (cyan, magenta, yellow and black). Other way of representing colours is by using an HSL or HSV colour model (hue, saturation, luminance/brightness/value), CIE (International Commission on Illumination, in French Commission internationale de l'éclairage) colour model or YUV.

In YUV colour space, the Y component determines the brightness, or luminance, of colour and the U and V components define the chrominance, or the colour itself. Generally Y values range from 0 to 1 (or 0 to 255 in digital formats) and U and V values range from –0.5 to 0.5 (or –128 to 127 in signed digital form, or 0 to 255 in unsigned form). Variations on YUV colour space exist, such as Y'UV, YUV, YCbCr, YPbPr. In some scenarios encoding image data based on YUV colour space (or a variant thereof, having luminance and chrominance components) can reduce the amount of data required to transmit an image. Generally this is because the chrominance components can be reduced or compressed without having a huge impact on human perception because the brightness information encoded by the luminance channel has comparatively greater impact on discerning the image detail.

The representation of a colour can be translated from one basis to another by colour space conversion or transformation.

Example System Configuration

FIG. 1 shows a block diagram overview of a system according to the current art. A host computer [11] is connected to a display control device [12], which is in turn connected to a display device [13]. The host [11] contains an application [14], which produces display data. The display data may be produced and sent for compression either as complete frames or as canvasses, which may, for example, be separate application windows. In either case, they are made up of tiles of pixels, where each tile is a geometrically-shaped collection of one or more pixels.

The display data is sent to a compression engine [15], which may comprise software running in a processor or an appropriate hardware engine. The compression engine [15] first performs an encoding of the data, for example using a Haar transformation, to convert the data into a format that may then be further compressed, minimising data loss.

The compression engine [15] may then further compress the data and thereafter sends the compressed data to an output engine [16]. The output engine [16] manages the connection with the display control device [12] and may, for example, include a socket for a cable to be plugged into for a wired connection or a radio transmitter for a wireless connection. In either case, it is connected to a corresponding input engine [17] on the display control device [12].

The input engine [17] is connected to a decompression engine [18]. When it receives compressed data it sends it to the decompression engine [18] or to a memory from which the decompression engine [18] can fetch it according to the operation of a decompression algorithm. In any case, the decompression engine [18] may decompress the data, if necessary, and performs a decoding operation, optionally using a reverse Haar transform. In the illustrated system, the decompressed data is then sent to a scaler [19]. In the case where the display data was produced and compressed as multiple canvasses, it may be composed into a frame at this point.

If scaling is necessary, it is preferable for it to be carried out on a display control device [12] as this minimises the volume of data to be transmitted from the host [11] to the display control device [12], and the scaler [19] operates to convert the received display data to the correct dimensions for display on the display device [13]. In some embodiments, the scaler may be omitted or may be implemented as part of the decompression engine. The data is then sent to an output engine [110] for transmission to the display device [13]. This may include, for example, converting the display data to a display-specific format such as VGA, HDMI, etc.

In one embodiment, the display device is a virtual reality headset [21], as illustrated in FIG. 2A, connected to a host device [22], which may be a computing device, gaming station, etc. The virtual reality headset [21] incorporates two display panels [23], which may be embodied as a single panel split by optical elements. In use, one display is presented to each of a viewer's eyes. The host device [22] generates image data for display on these panels [23] and transmits the image data to the virtual reality headset [21].

In another embodiment, the headset is a set of augmented reality glasses. As in the virtual reality headset [21] shown in FIG. 2A, there are two display panels, each associated with one of the user's eyes, but in this example the display panels are translucent.

The host device [22] may be a static computing device such as a computer, gaming console, etc., or may be a mobile computing device such as a smartphone or smartwatch. As previously described, it generates image data and transmits it to the augmented reality glasses or virtual reality headset [21] for display.

FIG. 2B shows a cross-section of part of the headset [21], showing a display panel [23] and a lens [24] in front of it, together with a user's eye [25] when the system is in use. The display panel [23] is similar to the display panel shown in FIG. 2A, and the lens [24] is of a standard type.

Display data is produced by the application [14] on the host [11] and transmitted to the headset [21], where it is received by the display control device [12]. It is processed for display on the display panels [23]. It is then sent to the display panels [23] for display. The user views it through the lenses [24], which allow focussing at the very close range required. However, they distort the image, in particular by chromatic aberration, as a lens [24] may introduce a colour shift to the image as observed by the viewer. For example, thick glass may introduce a slight blue or green tint. Chromatic aberration tends to be more pronounced at the edges or periphery of the image, where the angle is greatest. This may be known and accounted for by the application [14]; for example, the application [14] may introduce a slight red tint to the images prior to transmission, which may vary across the image.

The display device may be connected to the host device [11, 22] or display control device [12] if one is present by a wired or wireless connection. While a wired connection minimises latency in transmission of data from the host to the display, wireless connections give the user much greater freedom of movement within range of the wireless connection and are therefore preferable. A balance must be struck between high compression of data, in particular video data, which can be used to enable larger amounts of data (e.g. higher resolution video) to be transmitted between the host and display, and the latency that will be introduced by processing of the data.

Ideally, the end-to-end latency between sensing a user's head movement, generating the pixels in the next frame of the VR (virtual reality) scene and streaming the video should be kept below 20 ms, preferably below 10 ms, further preferably below 5 ms.

The wireless link should be implemented as a high bandwidth short-range wireless link, for example at least 12 Gbps, preferably at least 24 Gbps, preferably at least 30 Gbps. An "extremely high frequency (EHF)" radio connection, such as a 60 GHz radio connection is suitable for providing such high-bandwidth connections over short-range links. Such a radio connection can implement the WiFi standard IEEE 802.11ad.

The 71-76,81-86 and 92-95 GHz bands may also be used in some implementations.

The wireless links described above can provide transmission between the host and the display of more than 50 frames per second, preferably more than 70 fps, further preferably more than 90 fps.

FIG. 3 shows a system which is similar in operation to the embodiment shown in FIGS. 2A and 2B. In this case, however, there is no separate host device [22]. The entire system is contained in a single casing [31], for example in a smartphone or other such mobile computing device. The device contains a processor [33], which generates display data for display on the integral display panel [32]. The mobile computing device may be mounted such that the screen is held in front of the user's eyes as if it were the screen of a virtual reality headset.

Haar Encoding

Haar transformation process may be implemented in conjunction with the present system, such as those shown in FIGS. 2A, 2B and 3. The Haar transform takes place on the host [11], specifically in the compression engine [15]. Decompression takes place on the display control device [12], specifically in the decompression engine [18], where the data is put through an inverse Haar transform to return it to its original form.

Changing the Colour Space

Figure 4:
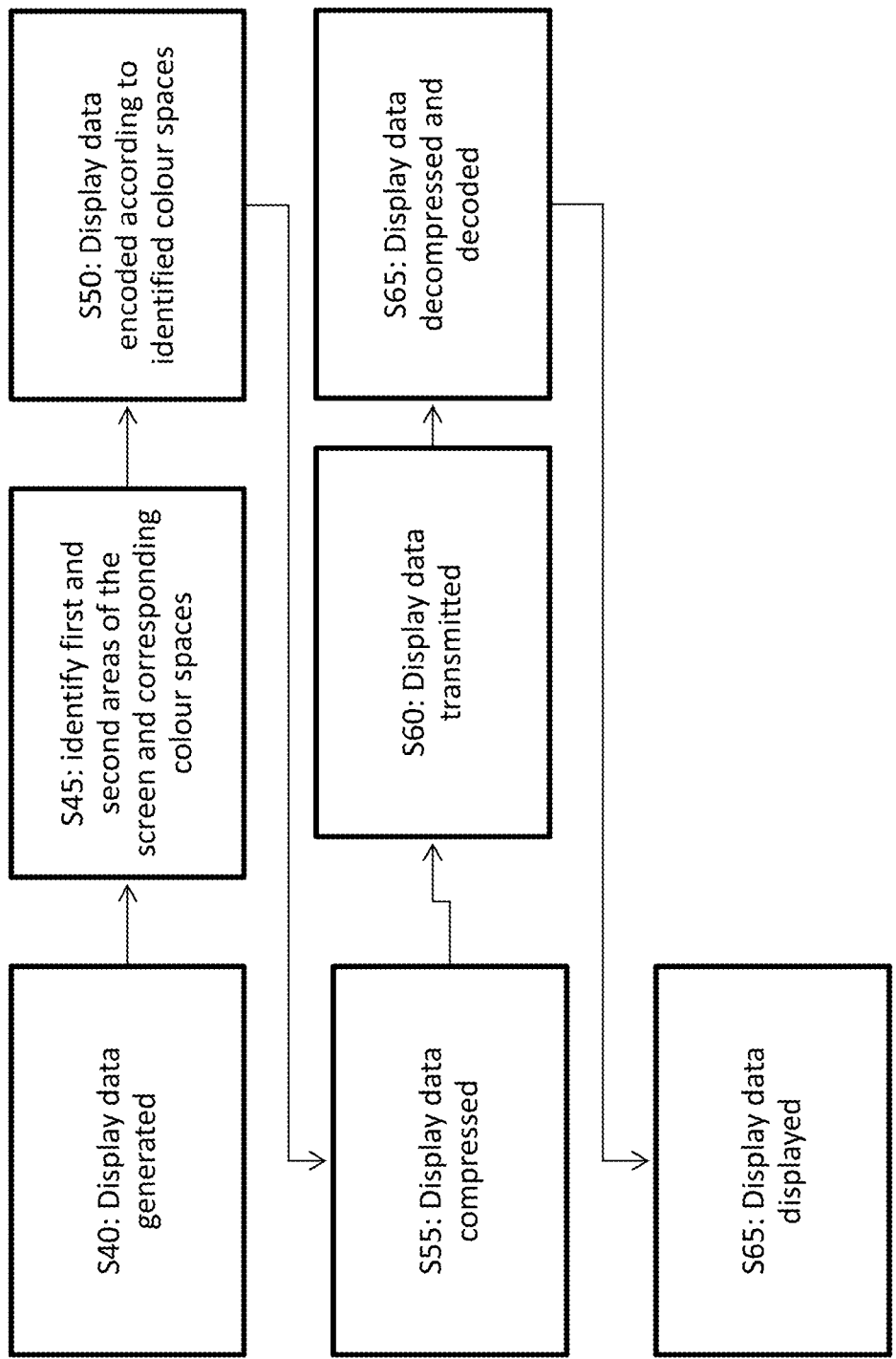
FIG. 4 illustrates an exemplary method for processing data for display.

FIG. 4 shows a flowchart of a generic version of the process followed.

At step S40 the next frame of display, or image, data is generated in the host [11] according to the operation of applications running on the host.

At step S45 the first and second areas of the screen are identified, along with corresponding first and second colour spaces. These may be preselected or predetermined, for example they may be the same for all screens, or for all frames shown on the same screen. Alternatively they may be determined dynamically, e.g. tailored to the particular screen equipment, image data of a frame or set of a plurality of (consecutive) frames or to the viewer.

The areas may be defined or identified dependent on distance from the centre, or focus, of the display or screen. This may allow for compensation due to the effects of the lens at different parts of the display or screen. For example, the first, or central, area may be defined as a circular zone within a certain radius of the central point or focus of the lens. The radius may be predetermined or may be determined based on a user preference, image content and/or a measured data speed or latency of a link over which data is transmitted.

Additionally or alternatively, the areas may be defined based on a characteristic of the lens, e.g. based on the curvature of the lens.

At step S50 the display data is encoded according to the identified colour spaces. Thus data that is intended for display on the first area of the screen or display (e.g. first portion of display data) will be encoded using the first colour space and data for display on the second area of the screen or display (e.g. second portion of display data) is encoded using the second colour space. The first and second portions of display data are generally data making up the same frame. This may involve performing a transformation on the display or image data, e.g. from one colour space to another. In some cases the data may be transformed from a colour space that is based on one colour model to a colour space based on a different colour model, for example a colour model having a different colour space. In other examples they may be based on the same colour model but have a different colour mapping function. A colour space which is more easily compressed may be selected for peripheral or less perceptually significant parts of the screen, such as the peripheral areas. In some cases, the generated display data may already be encoded using the first or second colour space. In such a case, the first or second display data may not be required to undergo further encoding or other transformation, if it is already in the corresponding desired colour space.

For example, the colour spaces and mapping functions described above may be used. In some embodiments a colour space having three colour components, such as RGB, is used at the edges (e.g. for encoding the second display data), whilst a colour space having chrominance and luminance components, such as YUV, or hue, saturation and luminance components, such as HSL or HSV, is used at the centre (e.g. for encoding the first display data).

A colour space having three colour components, such as RGB, may be preferred at the edges due to the effects of the lenses used in the system. This is because distortion effects may be greater at the edges of a display, e.g. due to aberration, such as chromatic aberration. The aberration may thus be larger at the edges, for example since light of different wavelengths is spread differently and the distortion appears greater at the edge of the image. This means using a colour space having chrominance and luminance components, such as YUV, would require more high-frequency data to encode this distortion and thus the data would be less easily compressed than if using a colour space having different components for different colours of light, e.g. RGB.

In alternative embodiments, more than two areas or two different colour spaces may be used, e.g. three or more.

The transformation may be performed using matrix multiplications. A number of algorithms are available to perform this.

In some examples, a transformation is performed that converts the image data from RGB to YUV. In one example, an arithmetic operation may be used. For example, an arithmetic operation may involve combining colour component values, such as RGB values, into chrominance and luminance values, such as YUV values.

In one example, a Reversible Color Transform (RCT) uses a modified YUV color space. Preferably, the transform does not introduce quantization errors, so it is fully reversible. In some implementations of the RCT, the numbers that cannot be expressed exactly in matrix form are rounded. An example matrix for the RCT is:

$$Y = \left\lfloor \frac{R + 2G + B}{4} \right\rfloor; C_B = B - G; C_R = R - G;$$

In another example, a YCoCg colour model is used. The Y value is a luma value, Co is a chrominance orange value and Cg is chrominance green. An exemplary matrix for transforming from RGB to YCoCg is:

$$\begin{bmatrix} Y \\ Cg \\ Co \end{bmatrix} = \begin{bmatrix} \frac{1}{4} & \frac{1}{2} & \frac{1}{4} \\ -\frac{1}{4} & \frac{1}{2} & -\frac{1}{4} \\ \frac{1}{2} & 0 & -\frac{1}{2} \end{bmatrix} \cdot \begin{bmatrix} R \\ G \\ B \end{bmatrix}$$

Preferably the values of Y are in the range from 0 to 1, while Cg and Co are in the range of −0.5 to 0. For example, pure red may be expressed in the RGB system as (1, 0, 0) and in the YCgCo system as (¼, −¼, ½).

At step S55 the display data is compressed. In some cases this compression may involve compressing certain colour data more than others. For example, data corresponding to a certain colour, or wavelength, (which may be perceived differently by a user in different parts of a user's vision) may be compressed more or less depending on which part of a user or viewer's vision it is likely to appear in. The display data may be compressed, for example, using a Haar transform.

In some embodiments quantisation may be used to compress the display data. Different quantisation may be used for different parts of the screen. E.g. some quantisation may be more lossy than others. It may be preferably to quantise the second image data more, e.g. to reduce data where it is less noticeable to a user.

At step S60 the display data is transmitted over a link to a display device, or a decoder connected to the display device, such as display control device [12]. The link may be a wireless link.

At step S65 the display data is decompressed and decoded. Generally the display, or screen, will require data to be in a single, specific colour space in order for it to be displayed. For example, the colour space may be RGB. Thus any data that is not in such a colour space when it is transmitted is transformed into a colour space for display. This may comprise transforming the colour space of one or both of the first and second portions of display data.

An exemplary transform for reversing the RCT shown at Step S50 is:

$$G = Y - \left\lfloor \frac{C_B + C_R}{4} \right\rfloor; R = C_R + G; B = C_B + G.$$

An exemplary transform for converting from the YCoCg shown at Step S50 to RGB is:

$$\begin{bmatrix} R \\ G \\ B \end{bmatrix} = \begin{bmatrix} 1 & -1 & 1 \\ 1 & 1 & 0 \\ 1 & -1 & -1 \end{bmatrix} \cdot \begin{bmatrix} Y \\ Cg \\ Co \end{bmatrix}$$

The data is displayed on the screen or display at step S65.

Figure 5A:
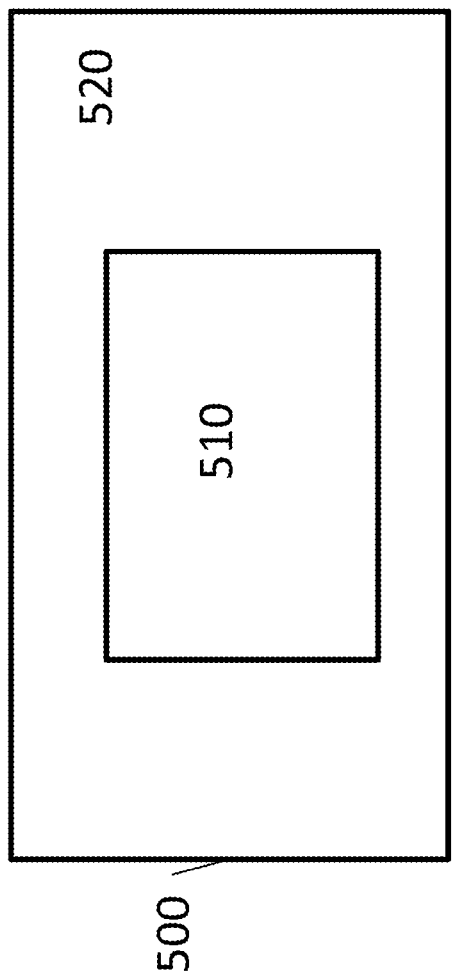
FIG. 5A illustrates an exemplary screen for displaying images.

FIG. 5A shows an exemplary screen [500] on which colour image data can be shown. The screen [500] may be used as the display panels [23] described above. The screen is divided into two areas. The first area, or region, [510] is a central region of the screen. The second area, or region, [520] is a peripheral area of the screen [500]. A first portion of display data which codes parts of the image to be displayed on the first area [510] is encoded using a first colour space. A second portion of display data for display on the second region [520] of the screen is encoded according to a different, second colour space. The second colour space may provide data that can be more easily compressed. However, the second colour space may provide data that may not produce such a good display for the viewer, but since this is will generally be in the peripheral vision of the user this is of minor significance. The first and second areas [510], [520] of the screen [500] are rectangular, in line with the shape of the entire screen.

Figure 5B:
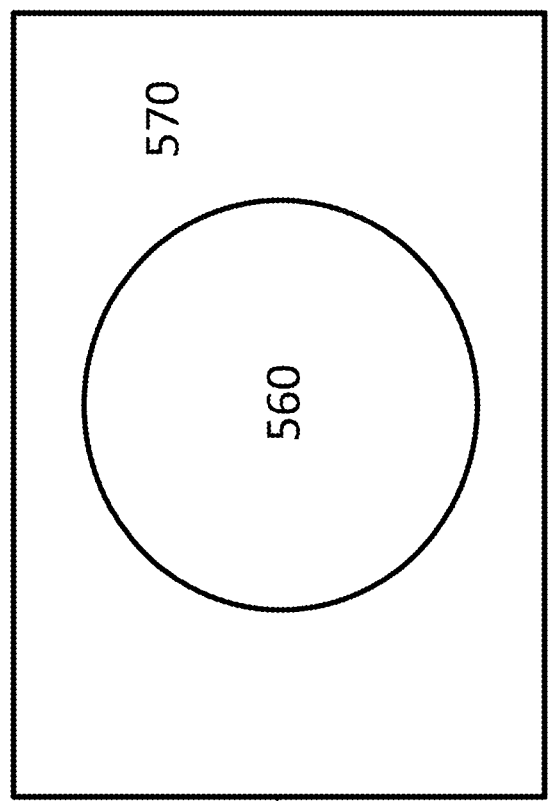
FIG. 5B illustrates another exemplary screen for displaying images.

FIG. 5B shows an exemplary screen [550] on which colour image data can be shown. The screen [550] may be used as the display panels [23] described above. The screen is divided into two areas. The first area, or region, [560] is a central region of the screen [550]. The second area, or region, [570] is a peripheral area of the screen [550]. The first region [560] is circular since this better reflects the region of the screen which will appear in a viewer's central, or foveal, vision (e.g. where the viewer's vision is more sensitive to chrominance/colour). A first portion of display data which codes parts of the image to be displayed on the first area [560] is encoded using a first colour space. A second portion of display data for display on the second region [570] of the screen is encoded according to a different, second colour space. The first colour space may preferentially encode (e.g. encode more precisely) colour data which the user can perceive better in their foveal vision and the second colour space may preferentially encode data which the user can better perceive in their peripheral vision.

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims.

Aspects of the apparatus and methods described herein are further exemplified in the following numbered CLAUSES:

CLAUSE 1. A method for processing data for display on a screen, the method comprising the steps of:
encoding, using a first colour space, a first portion of image data intended to be displayed on a first area of the screen;
encoding, using a second colour space, a second portion of image data intended to be displayed on a second area of the screen;
compressing the encoded first and second portions of the image data for transmission; and
transmitting the compressed image data over a link for display on the screen.

CLAUSE 2. A method according to CLAUSE 1, wherein:

the first area is a central zone of the screen, and/or an area expected to be viewed in a central portion of a viewer's vision; and/or the second area is a peripheral zone of the screen and/or an area expected to be viewed in a peripheral portion of the viewer's vision.

CLAUSE 3. A method according to CLAUSE 1 or CLAUSE 2, further comprising:

providing a model of the sensitivity of a viewer to light displayed at different locations on the screen; and selecting the first and second colour spaces and/or defining the first and second areas of the screen based on the model of the sensitivity of the viewer.

CLAUSE 4. A method according to CLAUSE 3, wherein the model of the sensitivity of a viewer to light comprises a measure of the sensitivity of the viewer to at least one of: chrominance, luminance, and light of different wavelengths.

CLAUSE 5. A method according to CLAUSE 3 or CLAUSE 4, further comprising defining the first and second areas of the screen by:

comparing the modelled sensitivity of the viewer across the screen to a threshold sensitivity;

defining an area of the screen for which the modelled sensitivity is above the threshold sensitivity as the first area of the screen; and defining an area of the screen for which the user sensitivity is below the threshold sensitivity as the second area of the screen.

CLAUSE 6. A method according to any of CLAUSE 3 to CLAUSE 5, wherein the model of the sensitivity of the viewer to light is based on an expected sensitivity of the viewer to light across the viewer's visual field and which locations of the screen are expected to be in the viewer's visual field in use.

CLAUSE 7. A method according to any of CLAUSE 3 to CLAUSE 6, wherein the model of the sensitivity of a viewer to light displayed at different locations on the screen is based on the configuration of the screen equipment and the expected position of the viewer in use.

CLAUSE 8. A method according to any preceding CLAUSE, further comprising:

determining a model of chromatic aberration of image data displayed on the screen;

selecting the first and second colour spaces and/or defining the first and second areas of the screen based on the determined model of chromatic aberration across the screen.

CLAUSE 9. A method according to CLAUSE 8, wherein the model of chromatic aberration is based on the display equipment and/or the expected position of the viewer's eye in use.

CLAUSE 10. A method according to CLAUSE 8 or CLAUSE 9, wherein determining a model of chromatic aberration across the frame comprises:

obtaining information regarding at least one characteristic of a lens located between the screen and the expected position of a viewer's eye in use.

CLAUSE 11. A method according to CLAUSE 10, wherein the at least one characteristic of the lens is one or more of:

the curvature of the lens;

the thickness of the lens; and the size or shape of lens.

CLAUSE 12. A method according to any of CLAUSE 9 to CLAUSE 11, wherein determining a model of chromatic aberration across the frame comprises obtaining information regarding one or more of:

the intended distance from the user's eye of the screen and/or lens in use; and the intended distance of the screen from the lens in use.

CLAUSE 13. A method according to any preceding CLAUSE, further comprising:

receiving image data intended to be displayed on the screen, prior to the steps of encoding the first and second portions of image data.

CLAUSE 14. A method according to any preceding CLAUSE, further comprising:

analysing the image data across the screen to identify a measure of the likely perceptual significance of the image data; and selecting the first and second colour spaces and/or defining the first and second areas of the screen based on the measure of the likely perceptual significance.

CLAUSE 15. A method according to CLAUSE 14, wherein the first portion of image data has a higher likely perceptual significance than the second portion of image data.

CLAUSE 16. A method according to CLAUSE 14 or CLAUSE 15, wherein analysing the image data to identify the expected relevance of the image data to a user's perception comprises analysing one or more of:

the amount or rate of movement in the image data (when the image data relates to video); and the presence of lines or contours, edges, colour transitions, sharpness, or contrast in the image data.

CLAUSE 17. A method according to any preceding CLAUSE, wherein the first colour space is based on a first colour model and the second colour space is based on a second colour model that is different from the first colour model.

CLAUSE 18. A method according to any of CLAUSES 1 to CLAUSE 16, wherein the first colour space and the second colour space are based on the same colour model; and the first colour space is defined by a first colour mapping function and the second colour space is defined by a second colour mapping function that is different from the first colour mapping function.

CLAUSE 19. A method according to any preceding CLAUSE, wherein:

the first colour space is based on a colour model having at least a luminance component and a chrominance component, preferably two chrominance components; and/or the second colour space is based on a colour model having three colour components.

CLAUSE 20. A method according to CLAUSE 19, wherein:

the colour model having three colour components is based on RGB, or modified versions thereof; and/or the colour model having a luminance and two chrominance components is based on YUV, or modified versions thereof.

CLAUSE 21. A method according to any preceding CLAUSE, wherein the colour spaces are based on one or more of the following colour models: RGB, YUV, and HSL, or modified versions thereof.

CLAUSE 22. A method according to any preceding CLAUSE, wherein encoding the first portion of image data and/or encoding the second portion of image data comprises:

altering the colour space of previously encoded image data.

CLAUSE 23. A method according to any preceding CLAUSE, wherein:
encoding the image data comprises performing a discrete cosine transform (DCT) to obtain a DC term and a plurality of AC terms for each frame block of the image data.

CLAUSE 24. A method according to any preceding CLAUSE, wherein compressing the encoded first and second portions of the image data for transmission comprises:
compressing the encoded first portion of image data using a compression method that is less lossy than the compression method used for compressing the second portion of the image data.

CLAUSE 25. A method according to any preceding CLAUSE, wherein compressing the encoded first and/or second portions of the image data for transmission is dependent on the colour encoded for in the image data, for example wherein the information retained relating to one colour is greater than the information retained relating to another colour.

CLAUSE 26. A method according to CLAUSE 25, wherein compressing the encoded second portion of the image data comprises retaining information relating to blue colours preferentially over data relating to other colours.

CLAUSE 27. A method according to any preceding CLAUSE, wherein the image data comprises a set of tiles, and wherein a single colour space is used for each tile.

CLAUSE 28. A method according to CLAUSE 27, further comprising: transmitting one or more flag bits per tile identifying the colour space used to encode the image data for that tile.

CLAUSE 29. A method according to any preceding CLAUSE, wherein the first and second colour spaces and/or first and second areas are predetermined.

CLAUSE 30. A method according to any of CLAUSES 1 to CLAUSE 28, wherein the first and second colour spaces and/or first and second areas are dynamically defined.

CLAUSE 31. A method according to CLAUSE 30, wherein the first and second colour spaces and/or first and second areas are defined based on one or more of:
a detection of the position or orientation of the eye of a viewer;
a model of the vision of an individual user or general model;
image content;
image data; and
a measured data speed or latency in the link.

CLAUSE 32. A method for processing data for display on a screen, the method comprising the steps of:
receiving compressed image data over a link, wherein the compressed image data comprises: a first portion of image data, encoded using a first colour space; and a second portion of image data, encoded using a second colour space;
decompressing the compressed image data;
identifying the first image data and the corresponding first colour space and the second image data and the corresponding second colour space;
decoding the image data;
providing the first portion of image data for display on a first area of the screen; and
providing the second portion of image data for display on a second area of the screen.

CLAUSE 33. A method for processing data for display on a screen according to CLAUSE 32, further comprising:
displaying the first portion of image data on a first area of the screen; and
displaying the second portion of image data on a second area of the screen.

CLAUSE 34. A method according to CLAUSE 32 or CLAUSE 33, wherein decoding the image data comprises:
transforming the colour space of at least one of the first and second portions of image data.

CLAUSE 35. A method according to any preceding CLAUSE, wherein the screen (and lens, where present) are mounted in a remote device, such as a headset configured to be worn on a viewer's head, preferably a virtual reality headset or an augmented reality set of glasses.

CLAUSE 36. A method according to any preceding CLAUSE, wherein the link is a wireless link.

CLAUSE 37. A method according to any preceding CLAUSE, wherein the display data comprises a set of frames for display on the screen at a frame rate of at least 50 frames per second, preferably at least 70 frames per second, more preferably about 90 frames per second.

CLAUSE 38. A method according to any preceding CLAUSE, wherein each of the first area of the screen and the second area of the screen make up at least 10% of the total screen, preferably at least 15%, more preferably at least 20% or at least 30%.

CLAUSE 39. An encoder device for processing data for display on a screen, the encoder device comprising:
a processor;
a memory; and
an interface for communicating with a decoder device over a link; wherein the encoder device is arranged to:
encode, using a first colour space, a first portion of image data intended to be displayed on a first area of the screen;
encode, using a second colour space, a second portion of image data intended to be displayed on a second area of the screen;
compress the encoded first and second portions of the image data for transmission; and
transmit the compressed image data over the link for display on the screen.

CLAUSE 40. An encoder device according to CLAUSE 39, further arranged to perform the method of any of CLAUSE 1 to CLAUSE 30 or CLAUSE 35 to CLAUSE 37 (when dependent on CLAUSES 1 to CLAUSE 30).

CLAUSE 41. A decoder device for processing data for display on a screen, the decoder device comprising:
a processor;
a memory; and
an interface for communicating with an encoder device over a link; wherein the encoder device is arranged to:
receive compressed image data over the link, wherein the compressed image data comprises: a first portion of image data, encoded using a first colour space; and a second portion of image data, encoded using a second colour space;
decompress the compressed image data;
decode the image data;
provide the first portion of image data for display on a first area of the screen; and
provide the second portion of image data for display on a second area of the screen.

CLAUSE 42. A decoder device according to CLAUSE 41, further arranged to perform the method of any of CLAUSE 33 to CLAUSE 37 (for CLAUSE 35 to CLAUSE 37, when dependent on CLAUSE 33 or CLAUSE 34).

CLAUSE 43. A system for displaying image data, the system comprising:
an encoder device according to CLAUSE 39 or CLAUSE 40;
a decoder device according to CLAUSE 41 or CLAUSE 42; and
a screen for displaying the image data.

CLAUSE 44. A system according to CLAUSE 43, further comprising a lens for positioning, in use, between the screen and the eye of a user.

CLAUSE 45. A system according to CLAUSE 43 or CLAUSE 44, wherein the screen is mounted in a remote device, such as a headset configured to be worn on a viewer's head, preferably a virtual reality headset or an augmented reality set of glasses.

CLAUSE 46. A system according to CLAUSE 45, wherein the decoder device is located in the remote device.

CLAUSE 47. A system according to any of CLAUSE 43 to CLAUSE 46, wherein the encoder device and the decoder device are arranged to communicate via a wireless link.

The invention claimed is:

1. A method for processing data for display on a screen, the method comprising the steps of:
 selecting a first colour space and a second colour space based on a model of sensitivity of a viewer to light displayed at a first area of the screen and a second area of the screen;
 encoding, using the first colour space, a first portion of image data intended to be displayed on the first area of the screen;
 encoding, using the second colour space, a second portion of the image data intended to be displayed on the second area of the screen;
 compressing the encoded first and second portions of the image data for transmission; and
 transmitting the compressed image data over a link for display on the screen.

2. The method of claim 1, wherein:
 the first area is a central zone of the screen, and/or an area expected to be viewed in a central portion of a viewer's vision; and/or
 the second area is a peripheral zone of the screen and/or an area expected to be viewed in a peripheral portion of the viewer's vision.

3. The method of claim 1, wherein the model of sensitivity of the viewer to light further includes sensitivity at a third area on the screen, the method further comprising:
 defining the first and second areas of the screen (1) based on the model of sensitivity of the viewer, wherein the model of sensitivity of the viewer to light comprises a measure of the sensitivity of the viewer to at least one of: chrominance, luminance, and light of different wavelengths; or (2) by:
 comparing the model of sensitivity of the viewer across the screen to a threshold sensitivity;
 defining an area of the screen for which the model of sensitivity of the viewer is above the threshold sensitivity as the first area of the screen; and
 defining an area of the screen for which the model of sensitivity of the viewer is below the threshold sensitivity as the second area of the screen; wherein
 the model of sensitivity of the viewer to light is based on an expected sensitivity of the viewer to light across the viewer's visual field and which locations of the screen are expected to be in the viewer's visual field in use; and wherein
 the model of sensitivity of the viewer to light displayed at different locations on the screen is based on a configuration of a screen equipment and an expected position of the viewer.

4. The method of claim 1, further comprising:
 determining a model of chromatic aberration of image data displayed on the screen;
 selecting the first and second colour spaces and/or defining the first and second areas of the screen based on the determined model of chromatic aberration across the screen, wherein the model of chromatic aberration is based on a screen equipment and/or an expected position of the viewer's eye wherein determining the model of chromatic aberration across the screen comprises:
 obtaining information regarding at least one characteristic of a lens located between the screen and the expected position of the viewer's eye.

5. The method of claim 1, further comprising:
 analysing the image data across the screen to identify a measure of perceptual significance of the image data; and
 selecting the first and second colour spaces and/or defining the first and second areas of the screen based on the measure of perceptual significance, wherein the first portion of image data has a higher perceptual significance than the second portion of image data; wherein analysing the image data to identify an expected relevance of the image data to the viewer's perception comprises analysing one or more of:
 an amount or a rate of movement in the image data; and
 a presence of lines or contours, edges, colour transitions, sharpness, or contrast in the image data.

6. The method of claim 1, wherein the first colour space is based on a first colour model and the second colour space is based on a second colour model that is different from the first colour model, or wherein the first colour space and the second colour space are based on the same colour model; and the first colour space is defined by a first colour mapping function and the second colour space is defined by a second colour mapping function that is different from the first colour mapping function.

7. The method of claim 1, wherein:
 the first colour space is based on a colour model having at least one luminance component and one chrominance component or two chrominance components; and/or
 the second colour space is based on a colour model having three colour components, wherein:
 the colour model having three colour components is based on RGB, or modified versions thereof; and/or
 the colour model having at least the one luminance component and two chrominance components is based on YUV, or modified versions thereof.

8. The method of claim 1, wherein the first and the second colour spaces are based on one or more of the following colour models: RGB, YUV, and HSL, or modified versions thereof.

9. The method of claim 1, wherein encoding the first portion of the image data and/or encoding the second portion of the image data comprises:
 altering a colour space of previously encoded image data.

10. The method of claim 1, wherein:
 encoding the first portion and the second portion of the image data comprises performing a discrete cosine transform (DCT) to obtain a DC term and a plurality of AC terms for each frame block of the image data.

11. The method of claim 1, wherein compressing the encoded first and second portions of the image data for transmission comprises:
 compressing the encoded first portion of image data using a compression method that is less lossy than a compression method used for compressing the second portion of the image data.

12. The method of claim 1, wherein compressing the encoded first and/or second portions of the image data for transmission is dependent on the first and second colour spaces encoded for in the image data, wherein information retained relating to one colour space is greater than information retained relating to another colour space, wherein compressing the encoded second portion of the image data comprises retaining information relating to blue colours preferentially over data relating to other colours.

13. The method of claim 1, wherein the first and second colour spaces and/or first and second areas are dynamically defined, wherein the first and second colour spaces and/or first and second areas are defined based on one or more of:
- a detection of a position or orientation of the eye of the viewer;
- a model of vision of an individual user or a general model;
- image content;
- image data; and
- a measured data speed or latency in the link.

14. The method of claim 1, wherein the first area of the screen and the second area of the screen each comprise at least 10%, at least 15%, at least 20%, or at least 30% of the screen.

15. A method for processing data for display on a screen, the method comprising the steps of:
- receiving compressed image data over a link, wherein the compressed image data comprises: a first portion of image data, encoded using a first colour space; and a second portion of the image data, encoded using a second colour space;
- decompressing the compressed image data;
- identifying the first portion of the image data and the corresponding first colour space and the second portion of the image data and the corresponding second colour space;
- decoding the image data;
- providing the first portion of the image data for display on a first area of the screen; and
- providing the second portion of the image data for display on a second area of the screen,
  - wherein the first colour space and the second colour space are selected based on a model of sensitivity of a viewer to light displayed at the first area and the second area of the screen.

16. The method of claim 15, further comprising:
- displaying the first portion of the image data on the first area of the screen; and
- displaying the second portion of the image data on the second area of the screen, wherein decoding the image data comprises:
  - transforming the colour space of at least one of the first and second portions of image data; wherein
    - the first area of the screen and the second area of the screen each comprise at least 10%, at least 15%, at least 20%, or at least 30% of the screen.

17. An encoder device for processing data for display on a screen, the encoder device comprising:
- a processor;
- a memory; and
- an interface for communicating with a decoder device over a link; wherein the encoder device is arranged to:
  - select a first colour space and a second colour space based on a model of sensitivity of a viewer to light displayed at a first area of the screen and a second area of the screen;
  - encode, using the first colour space, a first portion of image data intended to be displayed on the first area of the screen;
  - encode, using the second colour space, a second portion of the image data intended to be displayed on the second area of the screen;
  - compress the encoded first and second portions of the image data for transmission; and
  - transmit the compressed image data over the link for display on the screen.

18. A system for displaying image data, the system comprising:
- an encoder device according to claim 17;
- a decoder device comprising:
  - a second processor;
  - a second memory; and
  - a second interface for communicating with the encoder device over the link; wherein the decoder device is arranged to:
    - receive the compressed image data over the link
    - decompress the compressed image data;
    - decode the image data;
    - provide the first portion of the image data for display on the first area of the screen; and
    - provide the second portion of image data for display on the second area of the screen; and
- the screen for displaying the image data.

19. The system of claim 18, further comprising a lens for positioning between the screen and the eye of a user, wherein the screen is mounted in a remote device, a headset configured to be worn on a viewer's head, a virtual reality headset, or an augmented reality set of glasses, wherein the decoder device is located in the remote device; and wherein the encoder device and the decoder device are arranged to communicate via a wireless link.

20. A decoder device for processing data for display on a screen, the decoder device comprising:
- a processor;
- a memory; and
- an interface for communicating with an encoder device over a link; wherein the decoder device is arranged to:
  - receive compressed image data over the link, wherein the compressed image data comprises: a first portion of image data, encoded using a first colour space; and a second portion of image data, encoded using a second colour space;
  - decompress the compressed image data;
  - decode the image data;
  - provide the first portion of image data for display on a first area of the screen; and
  - provide the second portion of image data for display on a second area of the screen,
    - wherein the first colour space and the second colour space are selected based on a model of sensitivity of a viewer to light displayed at the first area and the second area of the screen.

* * * * *